Dec. 24, 1968 T. G. HUMPHREYS, JR 3,418,572
APPARATUS INCLUDING VARIABLE FREQUENCY INDICATING MEANS
FOR LOCATING AND TRACING CONDUCTIVE STRUCTURES
Filed Feb. 11, 1966
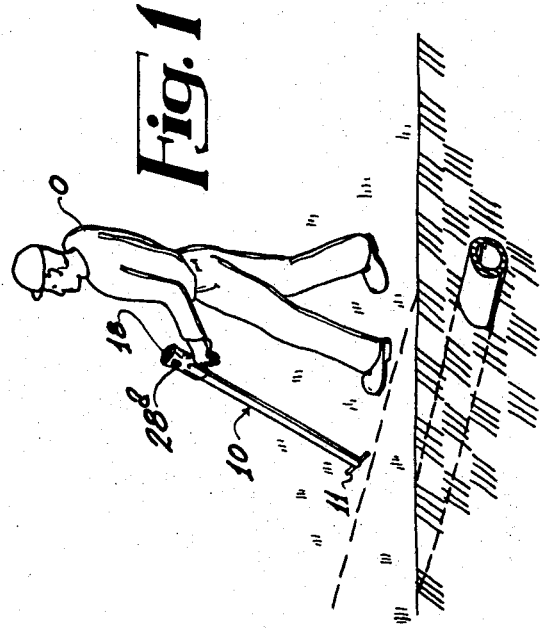
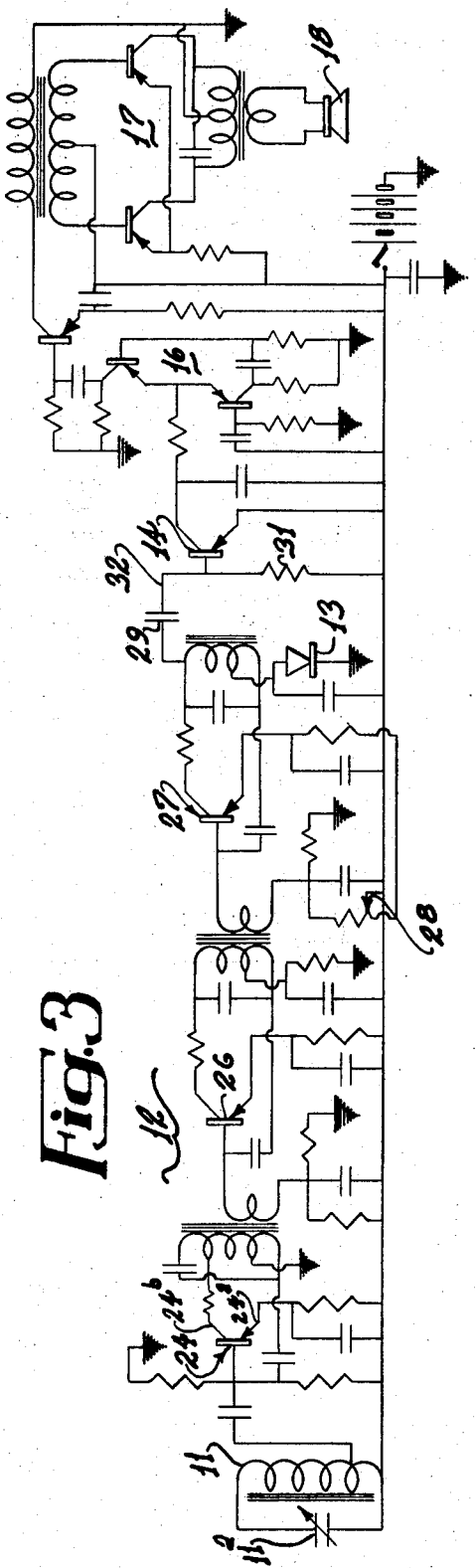
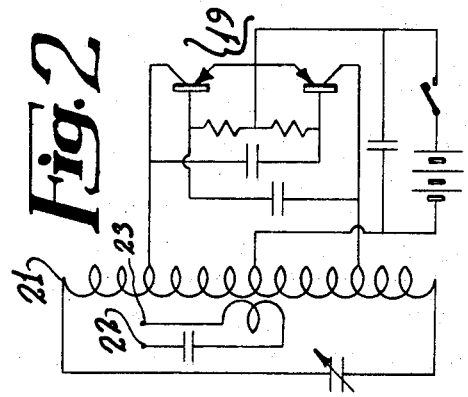
INVENTOR.
Thomas G. Humphreys
BY
Jennings, Carter & Thompson
Attorneys

United States Patent Office 3,418,572
Patented Dec. 24, 1968

3,418,572
APPARATUS INCLUDING VARIABLE FREQUENCY INDICATING MEANS FOR LOCATING AND TRACING CONDUCTIVE STRUCTURES
Thomas G. Humphreys, Jr., 2245 Pine Crest Drive, Birmingham, Ala. 35216
Filed Feb. 11, 1966, Ser. No. 526,735
8 Claims. (Cl. 324—67)

ABSTRACT OF THE DISCLOSURE

Apparatus for locating concealed conductive structures utilizing a pure unmodulated radio signal radiated by the structure to be located to activate and control a signaling device which produces a sound tone signal having a frequency proportional to the strength of the radio signal received by the signaling device. When the detector unit is close to the structure to be located the tone produced is pitched lower than when the detector is further away from the structure, the tone being of substantially the same intensity at all times.

---

This invention relates to apparatus for detecting buried or concealed pipes, cables and similar structures, and more particularly to such apparatus which utilizes an electro-magnetic signal radiated by the structure to be located.

So far as I am aware, all of the electronic locators for objects, such as pipes, cables and the like utilize a modulated radio signal from a transmitter, which signal is fed into the structure to be located either by inductive means or by direct electrical connection. The signal is picked up by a radio receiver with a directional loop and the operator looks for a maximum signal or a signal null depending on the orientation of the pick-up coil. Generally, the modulated signal is demodulated and amplified in the receiver, and then fed to a speaker to produce a sound tone. The sound tone thus produced is usually cluttered with miscellaneous radio noise signals. Often the noise signals produced will, in fact, be greater than the tone indicating the presence of the structure to be located, thus confusing the operator. For this reason the operator of these devices is required to be highly skilled and experienced if they are to be effective.

In view of the foregoing, it is a primary object of my invention to provide apparatus for detecting concealed structures such as pipes and the like which utilizes a pure unmodulated radio signal radiated by the structure to be located to activate and control a separate signaling device in the detector unit.

Another object of my invention is to provide apparatus as described above in which the unmodulated radio signal is produced in a simple generator unit from which it is fed to the structure to be located by induction or direct connection.

Still another object of my invention is to provide apparatus as described above in which the signal produced by the detector unit is a clear sound tone developed by an oscillator operating in the audio range, whereby there are no distracting random noise signals in the tone.

A further object of my invention is to provide apparatus as described above in which the circuit of both the generator unit and the detector unit are fully transistorized.

A still further object of my invention is to provide apparatus as described above in which the detector unit is equipped with a gain control whereby the sensitivity of the apparatus may be increased, thus to facilitate location of the concealed structure.

A still further object of my invention is to provide apparatus as described above in which the signal is produced only in the immediate presence of a pipe or cable, eliminating any need for judgment of signal level on the part of the operator.

A still further object of my invention is to provide apparatus as described above in which the frequency of the sound tone signal is controlled by the strength of the radio signal whereby when the detector unit is close to the structure to be located the tone produced is pitched lower than when the detector is further away from the structure, the tone being of substantially the same intensity at all times.

A still further object of my invention is to provide apparatus as described above which is fully self-contained, requiring no outside power source.

Apparatus embodying features of my invention is illustrated in the accompanying drawing, forming a part hereof, in which:

FIG. 1 is a pictorial view of the detector unit in use;
FIG. 2 is a diagram of the generator circuit; and
FIG. 3 is a diagram of the detector unit circuit.

Briefly, my invention comprises a detector unit indicated generally at 10 in FIG. 1 and a generator unit illustrated diagrammatically in FIG. 2. The detector unit itself comprises a pick-up or receiver coil 11 in circuit with a three-stage amplifier indicated generally at 12. The output of the amplifier 12 is utilized to control the base bias of a transistor 14, whereby the transistor 14 operates substantially as a switch to control a multi-vibrator indicated generally at 16. The multi-vibrator 16 is tuned to operate in the audible range and produces an output signal which is amplified in a power amplifier 17 and fed to a speaker or transducer 18 when the transistor 14 is forward biased as will later appear.

As shown in FIG. 2 the generator comprises a multi-vibrator or oscillator 19 the output of which is fed to an induction-capacitance antenna loop 21. The signal in the loop 21 will induce a similar signal in any metallic object near it. Therefore, as the loop is positioned close to a known portion of the structure to be located, a signal of the same frequency as that in the loop will be generated in the structure, thus causing the structure to radiate a signal of substantially the same frequency as that produced by the oscillator 19. If a portion of the structure to be located is exposed, the generator may be connected directly to the structure by means of leads 22 and 23, one being attached to the structure itself and the other being grounded. When the generator is connected to the structure itself, the signal radiated by the structure is, of course, considerably stronger than the signal that is radiated when the generator is inductively coupled to the structure.

The operation of my invention may now be briefly described. With the generator located near a known position of the structure to be located, or attached as described above to some exposed part of that structure, and operating, the detector unit is turned on and held close to the generator and tuned to pick up the generated signal in response to which it produces its tone or signal. The detector unit is then taken some distance, say 10 feet, away from the generator and the gain control is turned until the signal is not produced by the detector unit. The operator then moves the detector unit over the general area where the structure is believed to be located. As the operator approaches the position of the structure a signal will be produced by the detector. When the detector is brought nearer to the structure, the pitch or frequency of the tone changes, the pitch being lowest when the detector is nearest the structure to be located, thus the structure can be located by observing the pitch of the tone.

In the event that the structure is deeply buried, or for some other reason it is not feasible to observe the pitch of the tone the detector may be used as follows:

As the operator brings the detector near to the structure a signal will be produced by the detector as described above. The operator may then increase the sensitivity of the unit by reducing the gain control further until the signal once again is not produced. Thus the search area for the structure is reduced. The operator continues to move the detector unit over the ground and when the signal is again produced the gain control is reduced still more until a point is located at which the signal drops off on either side, this point being directly above the buried or concealed structure. The operator may now follow the buried structure by moving the detector unit over the ground in such a way as to maintain a signal output from the detector unit.

Returning to the detector unit, I shall now describe the circuitry in greater detail. The pick-up coil 11 of the receiver amplifier may be an antenna coil having a ferrite core. Connected parallel across the ends of the pick-up coil is a variable capacitor 11$^a$, whereby the resonant frequency of the coil and capacitor is pre-tuned to the signal radiated by the structure. The pick-up coil is capacitively coupled with a transistor amplifier indicated generally at 24. This amplifier is of a typical configuration in which the signal is fed to the base of the transistor to control the current between the emitter 24$^a$ and the collector 24$^b$ of the transistor. A second transistor amplifier 26 is inductively coupled as the load of the first amplifier 24, and is in turn inductively coupled to the input of a third transistor amplifier 27. A variable resistance voltage divider 28 is provided in the base-emitter circuit of the amplifier 27 to provide a gain control for the output of the receiver-amplifier circuitry. A feed back circuit may be provided to increase the overall sensitivity and gain of the amplifiers. A diode 13 in the load circuitry of amplifier 27 serves to reduce the possibility of self oscillation in the radio frequency amplifier by reducing coupling through the common power supply. The output of the amplifier is, in effect rectified to a direct current signal by the base circuit of transistor 14 to which it is supplied through a capacitor 29. Resistor 31 provides the no signal base bias for the transistor 14. Thus the transistor 14 is biased just under cutoff so that no curent flows between the emitter and collector of the transistor unless a signal is produced in a lead 32 by the receiver-amplifier circuitry of sufficient strength to bring the base voltage of the transistor 14 up to a forward bias, whereupon the transistor 14 conducts. Thus, the transistor 14 acts as a switch which ordinarily does not conduct, that is to say, is open, but when a signal of sufficient strength is produced by the receiver-amplifier circuitry the switch conducts or closes. With the transistor 14 in the conduct state, current is fed to the multi-vibraor 16. Multi-vibrator 16 is a typical oscillator, with the values of the resistances and capacitances in its circuitry chosen so that it produces a signal having a frequency in the audible range, preferably of a value which when the signal is amplified by amplifier 17 and produced as sound by the speaker or transducer 18 it will give a clear, easily heard tone.

It is noted that the signal produced in lead 32 by the receiver-amplifier is substantially proportional to the distance between the detector and the structure to be located. It is further noted that transisor 14 may be considered a variable resistance in the base circuit of the oscillator 16, the resistance being in effect inversely proportional to the strength of the signal in lead 32. The frequency of the output of the oscillator 16 is controlled by the base circuit resistance thus when the signal produced by the detector-amplifier in lead 32 is sufficient to forward bias the transistor the oscillator 16 produces a relatively high (audio) frequency signal which gives a high pitched tone from the speaker 18. As the detector nears the hidden structure the strength of the signal in lead 32 is increased and transistor 14 conducts more current (its effective resistance is lowered) and the oscillator produces a lower frequency signal which results in a relatively low pitched tone from the speaker 18.

To recapitulate, a signal is generated in the oscillator 19 and is fed to the concealed conductive structure to be located, whereby the structure acts in a manner similar to an antenna to radiate a radio signal of the same frequency as that produced in the oscillator 19. The signal radiated by the structure induces a current in the coil 11, the strength of which is substantially proportional to the distance between the coil 11 and the concealed structure. The current induced in the coil 11 provides a control signal for a 3-stage amplifier which has a rectified output. The output signal from the amplifier 12 controls a switch 14. That is to say, when the signal from the amplifier reaches a certain level the transistor 14 conducts thus to activate an oscillator 16 to produce an audio frequency signal which in turn operates a speaker 18 to produce a tone. If the signal produced in the coil is of such a level that when amplified through the amplifier 12 the signal in the lead 32 is insufficient to cause the transistor 14 to conduct, no sound signal is produced at the speaker 18. However, as the coil 11 nears the structure to be located, the strength of its signal increases, and the strength of the signal at 32 increases also. Thus, when the coil 11 is reasonably close to the structure to be located transistor 14 is caused to conduct and a signal tone is produced from the speaker 18. The pitch of the tone produced by the speaker 18 varies from a relatively high pitch to a relatively low pitch as the detector nears the hidden structure.

The variable capacitance or tuning capacitance 11$^a$ is preset. The gain control, that is to say, the variable resistance 28 in the base circuit of the transistor 27 is controlled by a knob 28$^a$ illustrated in FIG. 1.

While I have shown and described my invention as embodying a sound signal device, it is obvious that the transistor 14 could operate any signal device, such as for instance a light, in which case the second of the two methods of operation described above would probably be utilized.

From the foregoing, it is seen that I have devised a new and improved locator for pipes, wires, cables, bars, or any concealed structure which is conductive, or which in effect may be made to be conductive by inserting a wire or the like therein. I provide a locator which is compact and durable, relatively simple and is easy and inexpensive to manufacture. Furthermore, it is easy to operate by even the most inexperienced operators, as it provides a definite unequivocal signal when the structure to be located is approached.

In this specification and in the claims appended, I have referred to electrically conductive structure, by which term I mean any structure which in itself is electrically conductive such as metallic pipes, wires, cables and the like, and any structure which may be made to be conductive, as by inserting a wire in a non-conductive plastic pipe, or even by manufacturing the pipe with a conductive tape or wire attached thereto, whereby the structure is in effect conductive.

While I have shown my invention in but one form, it will be obvious to those skilled in the art that it is not so limited, but is susceptible of various changes and modifications without departing from the spirit thereof, and I desired, therefore, that only such limitations shall be placed thereupon as are specifically set forth in the appended claims.

What I claim is:
1. In apparatus for locating and tracing electrically conductive structures,
   (a) a generator producing a predetermined radio frequency signal,
   (b) means electrically coupling said generator to the conductive structure so that the conductive structure radiates a radio signal of substantially the same frequency as that produced by the generator,

(c) a radio frequency receiver adapted to detect the signal radiated by the conductive structure and produce an output signal having a strength level proportional to the distance between said conductive structure and said receiver, (d) an oscillator connected to said receiver and tuned to produce a substantially unvarying intensity audio signal the frequency of which varies in response to the strength level of the output signal produced by the radio frequency receiver, and (e) a transducer converting said audio signal to a corresponding audible sound tone having a frequency proportional to said distance between said conductive structure and said receiver.

2. Apparatus as defined in claim 1 in which said oscillator includes a transistor biased below cut off, said transistor serving as a variable resistance in the oscillator, such resistance being inversely proportional to the output signal produced by the receiver so that when the output signal reaches a certain level the transitsor is made conductive as a high resistance, and upon an increase in said output signal the transistor operates as a lower resistance.

3. Apparatus as defined in claim 2 in which said means to couple said generator to the conductive structure comprises on induction coil.

4. Apparatus as defined in claim 2 which includes means to control the sensitivity of said receiver.

5. Apparatus as defined in claim 2 which includes means to vary the frequency of the signal produced by the generator.

6. Apparatus as defined in claim 2 which includes means to tune the receiver to detect the signal produced by the generator and radiated by the conductive structure.

7. Apparatus as defined in claim 2 which includes means connecting said generator directly to an exposed portion of said structure.

8. Apparatus as defined in claim 1 in which the generator produces a substantially pure unmodulated radio frequency signal.

References Cited

UNITED STATES PATENTS 2,393,717  1/1946  Speaker _____ 324—3 X
2,663,800  12/1953  Herzog _____ 332—29 X RUDOLPH V. ROLINEC, *Primary Examiner.*

G. R. STRECKER, *Assistant Examiner.*

U.S. Cl. X.R.

324—3; 340—258